Patented Aug. 1, 1933

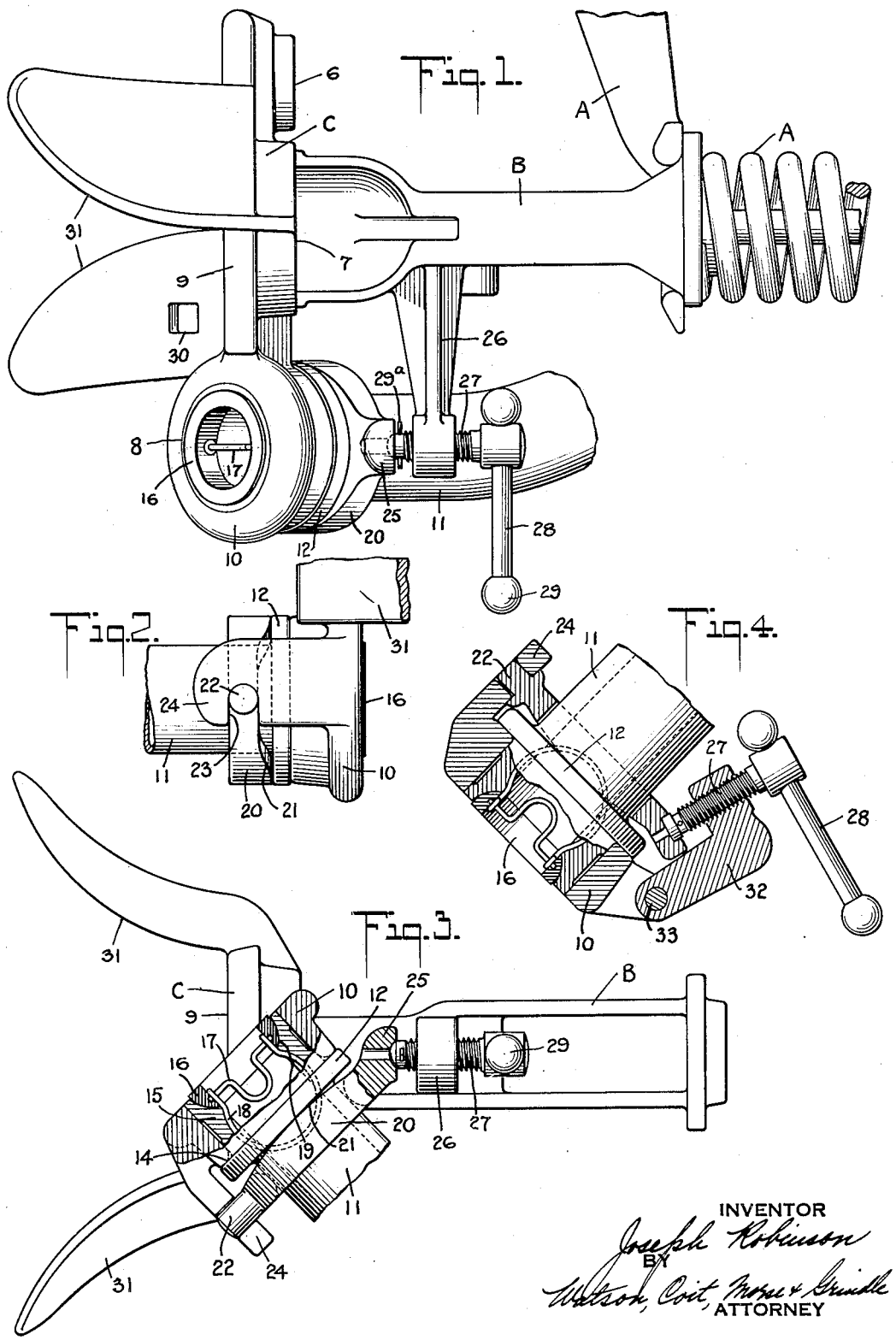

1,920,278

UNITED STATES PATENT OFFICE 1,920,278

AUTOMATIC TRAIN PIPE CONNECTER

Joseph Robinson, New York, N. Y.

Application July 27, 1929, Serial No. 381,493
Renewed October 21, 1932

8 Claims. (Cl. 285—53.)

My invention relates to automatic train pipe connecters and particularly to a coupling head therefor having a plurality of ports one of which is disposed obliquely to the longitudinal direction of the connecter. One of the objects of my invention is to provide improved means for removably mounting a conduit in the port of the connecter head, whereby the conduit and the gasket carried thereby may be removed and replaced at will while the heads remain coupled. In the present application I show this improved means applied to an obliquely disposed port in the head, but it may be otherwise used.

In the drawing Figure 1 is a side elevation of my improvement;

Figure 2 is a detailed view, in elevation, of the locking dog forming a part of my invention;

Figure 3 is a sectional plan view of my improvement as it would appear looking upwardly against the bottom thereof, and Figure 4 is a modification of the locking mechanism of my invention.

Any suitable supporting means may be employed to carry my improvement. I show a support A such as shown and described in my co-pending application Serial #304,907 filed Sept. 10, 1928. Upon the forward end of the carrier or yoke B I mount my improved coupling head C which is provided with a plurality of vertically aligned ports or openings 6, 7, 8. The lower or steam port 8 is disposed obliquely to the longitudinal direction of the connecter, preferably at an angle of 45° to such direction. This port may be formed separately of the base 9 of the head and suitably secured thereto, but I preferably cast same integral with the base. Within the housing or chamber 10 I removably mount a tubular conduit 11. This conduit may be the forward end of a flexible metallic steam or other hose, or it may be a fitting to which the usual steam rubber hose in common use in railway service, is attached. In the present construction I have arranged my invention with the ruggedness and strength best suiting it to receive this fitting when the latter is a part of a flexible metallic steam hose. The fitting is provided with a shoulder or stop 12 adapted to engage the rear face 14 of the chamber 10, and with a forward end 15 adapted to fit quite snugly within the chamber. The chamber is preferably quite deep, and the shoulder quite wide to strongly resist the lateral strains on the conduit 11. This forward end of the conduit carries an adjustable gasket 16 which may be formed of any suitable material, preferably a relatively hard substance.

Retaining rings 17 and 18 secure the gasket in place but permit it to rock somewhat in its curved seat 19 in the end 15 of the fitting 11. A collar or retaining ring or member 20 surrounds the fitting at the rear of the shoulder 12. The front face of the collar 20 is curved at 21 to give it a rocking or pivotal seat on the shoulder 12. On one side, the collar is provided with a trunnion or finger 22 which projects into the opening 23 in the dog or anchor lug 24 as shown particularly in Figures 2 and 3, which lug is secured to the chamber 10. On the other side, diametrically opposite to the finger 22, the collar is provided with a head or seat 25. Tending downwardly from the bottom of the yoke, and formed integral therewith or otherwise secured thereto, I provide a bracket 26, the lower end of which is threaded to receive the adjusting or clamping screw 27 which is threaded forwardly into the seat in the head or portion 25. The rear end of the adjusting screw is enlarged to receive a handle 28, one end of which has mounted thereon a ball 29. A pin 29$^a$ or other means prevent accidental loss of the screw 27 from the bracket 26. From this arrangement it will be seen that the member 20 can rock or move about its pivot in a plane parallel to the axis of the conduit 11 or, in other words, toward and from the front end of the port 8. It will be noted that the longitudinal axis of the fitting 11 and the gasket 16 intercept the vertical center line of the coupling head C in the plane of the front face of the latter—see particularly Figure 3. An automatic lock, such as shown in my above co-pending application, for locking mated heads C together, may be employed with my improvement, the opening 30 in the wings 31 of the head being provided to receive such lock.

When it is desired to mount the fitting 11 in the chamber 10 the fitting is placed in the chamber and the collar 20 is rotated on the fitting until the finger 22 comes into position in the throat or opening in the dog 24. This positioning of the collar brings the head 25 thereof into alignment with the adjustment screw 27, which is then screwed forward firmly forcing the fitting forwardly in the chamber until the shoulder 12 bears against the rear face of the chamber, as shown in Figure 3. This bearing surface may, if desired, be reduced to avoid adverse effect of the accumulation thereon of foreign substances. The reverse of this operation will remove the fitting from the chamber 10.

It is common experience in using relatively hard gaskets in the hand couplings now employed to connect the steam hose between railway cars, to have to force such couplings tightly together by means of a wedge or the like in order to obtain or maintain a tight joint. It is for this reason, among other things, that my present invention is particularly useful, inasmuch as it provides screw or wedge means for powerfully forcing opposing metallic, or other relatively hard gaskets, tightly together. Thus, if for any reason, it is desired to get a power or wedge action on the gaskets used with my improvement, adequate and dependable means therefor are provided. Great clamping power is secured through the medium of the adjustment screw 27 and the collar 20, the finger 22 of which latter is pivoted in the opening in the dog 24.

In Figure 4 I illustrate a modification of my improvement in which the locking screw 27 is mounted in a base or bracket 32 which is pivoted, as at 33, to one side of the chamber 10. With this arrangement, when the adjustment screw is released the base is swung out of the way of the collar 20 to permit the fitting 11 to be removed. Other modifications may of course be made in my improvement for which reason I do not desire to be limited to the exact construction shown.

What I claim is:

1. An automatic train pipe connecter, comprising in combination a coupling head, a member secured thereto and extending rearwardly therefrom for supporting the head, said head being provided with a port which extends obliquely to the longitudinal direction of the connecter, a conduit in said port and carrying a gasket, an anchor device attached to one side of the port, a collar embracing said conduit and engaging said anchor device, a bracket attached to said member and extending downwardly therefrom, and means threaded through said bracket into engagement with said collar for forcing the conduit longitudinally in said port to press said gasket tightly against a mating gasket and to permit removal and replacement of the gasket while mating coupling heads remain coupled.

2. In an automatic train pipe connecter, in combination, a coupling head adapted to engage with a mating head, said head having an opening extending therethrough, a conduit mounted in said opening and being insertable in and removable rearwardly therefrom while said head is in engagement with a mating head, said conduit having a shoulder thereon rearwardly of its front end, said head having a portion against which said shoulder is adapted to abut when said conduit is in said opening, a collar embracing said conduit at the rear of said shoulder, said collar being rotatable on the conduit, said head on one side of said opening having a lug for engaging a part on said collar when the collar is rotated on the conduit, and adjustable means mounted on the other side of said opening and movable into and out of engagement with said collar, to force the same against said shoulder and lock the conduit in said opening.

3. The combination with an automatic train pipe connecter head having an opening therein, of means for removably locking a conduit in said opening, said means comprising a collar rotatably mounted on said conduit, said head having on one side of said opening a lug beneath which a part of said collar is received when the latter is rotated on the conduit, an adjustable member arranged on the other side of said opening and movable into and out of engagement with said collar, and said conduit having a part arranged to be engaged by said collar when the collar is forced forwardly of said member.

4. In an automatic train pipe connecter, in combination, a coupling head adapted to engage with a mating head, said head having an opening extending therethrough, a conduit mounted in said opening and being insertable in and removable rearwardly from said opening while the head is engaged by a mating head, said conduit having a shoulder thereon rearwardly of its front end, a collar embracing said conduit at the rear of said shoulder, said collar being rotatable on the conduit, said head on one side of said opening having a lug for engaging a part on said collar when the collar is rotated on the conduit, a part rigidly connected to said head and arranged on the other side of said opening, an adjustable member mounted in said part and movable into and out of engagement with said collar, whereby the collar may be forced forwardly against said shoulder on the conduit to lock the latter in said opening.

5. In an automatic train pipe connecter, in combination, a coupling head adapted to engage with a mating head, said head having an opening extending therethrough, a conduit mounted in said opening and being insertable in and removable rearwardly from said opening while the head is engaged by a mating head, said conduit having a shoulder thereon rearwardly of its front end, a collar embracing said conduit at the rear of said shoulder, said collar being rotatable on the conduit, said head on one side of said opening having a lug for engaging a part on said collar when the collar is rotated on the conduit, a part pivotally connected to said head on the other side of said opening, and adjustable member mounted in said pivoted part and adapted to be moved into and out of engagement with said collar, whereby the collar is pressed into engagement with said lug on the conduit and the latter locked in said opening.

6. A construction as specified in claim 5 in which said adjustable member comprises a screw threaded into said pivoted part on said head.

7. Means for removably locking a conduit in a train pipe connecter head, said means comprising a member supported on the conduit and rotatable relative thereto, said connecter head having a portion on one side of said conduit adapted to engage a part of said member when the same is rotated relative to the conduit, a threaded device arranged on the other side of said conduit and adapted to be turned into engagement with said member whereby said member may be forced forwardly in said head, said head having a portion adapted to engage the conduit when forced forwardly.

8. Means for removably locking a conduit in line with an opening in a train pipe connecter head, said means comprising a part on one side of said opening, a member carried by said conduit and rotatable into engagement with said part, a threaded device arranged on the other side of said opening and movable into and out of engagement with said member whereby said member and conduit are forced forwardly toward the opening in said head.

JOSEPH ROBINSON.